United States Patent
Lee et al.

(10) Patent No.: US 11,703,346 B2
(45) Date of Patent: Jul. 18, 2023

(54) VEHICLE AND CONTROL METHOD THEREOF

(71) Applicants: HYUNDAI MOTOR COMPANY, Seoul (KR); KIA CORPORATION, Seoul (KR)

(72) Inventors: Jaewoong Lee, Anyang-si (KR); Jae Kyung Choi, Changwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 61 days.

(21) Appl. No.: 17/396,406

(22) Filed: Aug. 6, 2021

(65) Prior Publication Data

US 2022/0065655 A1   Mar. 3, 2022

(30) Foreign Application Priority Data

Sep. 1, 2020   (KR) .................. 10-2020-0110936

(51) Int. Cl.
  *G01C 21/00*   (2006.01)
  *G01C 21/32*   (2006.01)
  (Continued)

(52) U.S. Cl.
  CPC ......... *G01C 21/3807* (2020.08); *B60W 40/09* (2013.01); *G01C 21/32* (2013.01); *G01C 21/3691* (2013.01); *B60W 2540/221* (2020.02)

(58) Field of Classification Search
  None
  See application file for complete search history.

(56) References Cited

U.S. PATENT DOCUMENTS

| 6,710,774 B1 * | 3/2004 | Kawasaki | ......... G01C 21/3638 345/419 |
| 2007/0253597 A1 * | 11/2007 | Utida | .................... B60Q 1/085 382/104 |

(Continued)

FOREIGN PATENT DOCUMENTS

CN   110861648 A   *   3/2020
JP   2017156153 A   *   9/2017

(Continued)

OTHER PUBLICATIONS

Machine translation of JP-2017156153-A (Year: 2017).*

(Continued)

*Primary Examiner* — Anne Marie Antonucci
*Assistant Examiner* — Kyle S Park
(74) *Attorney, Agent, or Firm* — Lempia Summerfield Katz LLC

(57) ABSTRACT

A vehicle and control method thereof are intended to promote safe driving of a driver by securing a map of surroundings around the vehicle and displaying a guide line for safe driving when the driver needs to display a guide line for safe driving while the vehicle is driving. The control method of the vehicle includes: checking whether a preset condition for generating a map and displaying a guide line is satisfied while the vehicle is driving; and generating a new map of the surroundings around a place where the vehicle is located and displaying the guide line for safe driving on the map when the preset condition for generating the map and displaying the guide line is satisfied.

18 Claims, 4 Drawing Sheets

(51) Int. Cl.
  *G01C 21/36* (2006.01)
  *B60W 40/09* (2012.01)

(56) References Cited

U.S. PATENT DOCUMENTS

| | | | | |
|---|---|---|---|---|
| 2010/0066833 A1* | 3/2010 | Ohshima | ............... | B60R 1/00 |
| | | | | 348/148 |
| 2010/0219051 A1* | 9/2010 | Shimizu | ............... | B60Q 1/40 |
| | | | | 200/61.27 |
| 2020/0269759 A1* | 8/2020 | Watanabe | ............ | B60K 35/00 |

FOREIGN PATENT DOCUMENTS

| | | | | | |
|---|---|---|---|---|---|
| KR | 20150078476 A | * | 7/2015 | | |
| WO | WO-2007032169 A1 | * | 3/2007 | ............ | B60W 30/10 |
| WO | WO-2021182655 A1 | * | 9/2021 | | |

OTHER PUBLICATIONS

Machine translation of KR-20150078476-A (Year: 2015).*
Machine translation of CN-110861648-A (Year: 2020).*
Machine translation of WO-2021182655-A1 (Year: 2021).*
Machine translation of WO-2007032169-A1 (Year: 2007).*

* cited by examiner

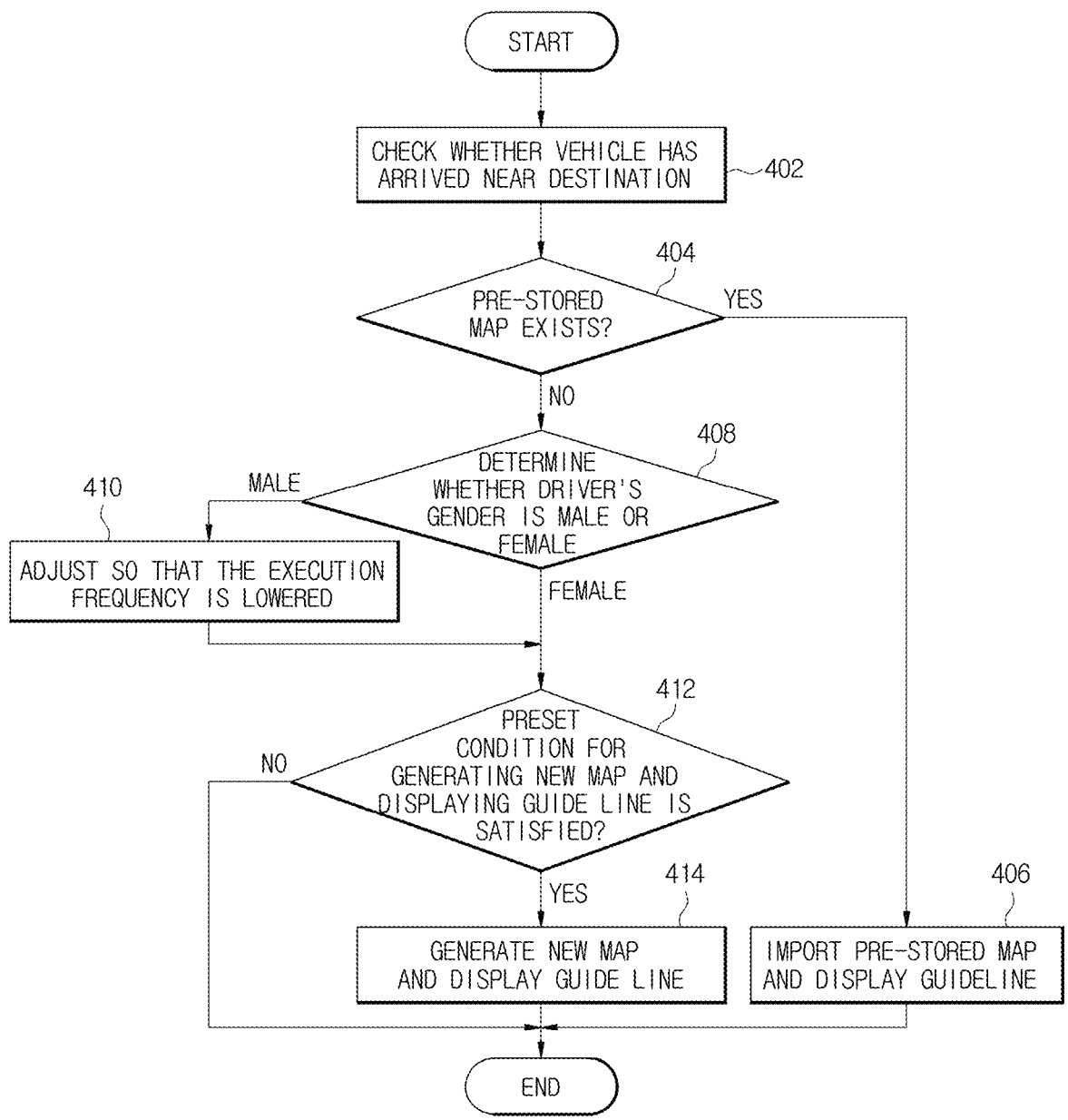

VEHICLE AND CONTROL METHOD THEREOF

CROSS-REFERENCE TO RELATED APPLICATION

This application is based on and claims priority under 35 U.S.C. § 119 to Korean Patent Application No. 10-2020-0110936, filed on Sep. 1, 2020 in the Korean Intellectual Property Office, the disclosure of which is incorporated herein by reference.

BACKGROUND

1. Technical Field

The present disclosure relates to a vehicle and to a guide for safe driving of a vehicle.

2. Description of the Related Art

If a driver's skill level is high, even in a place that is difficult to drive, a vehicle can be driven relatively easily. However, if the driver's skill level is not high, driving may be difficult even in a place that is easy to drive.

For example, when entering a parking lot in a building, driving along a narrow and curved driveway can be very difficult for an unskilled driver. Alternatively, when turning a corner with a bend at 90 degrees, an experienced driver can safely drive out of the corner with sufficient clearance between the corner and the vehicle, but an unskilled driver may not have enough clearance and may cause a contact accident.

SUMMARY

The present disclosure is intended to promote safe driving of a driver by securing a map of the surroundings around the vehicle and displaying the guide line or directions for safe driving when the driver needs to display a guide line or driving path for safe driving while the vehicle is driving.

In accordance with one aspect of the disclosure, a control method of a vehicle includes: checking whether a preset condition for generating a map and displaying a guide line is satisfied while the vehicle is driving; and generating a map of the surroundings around a place where the vehicle is located and displaying the guide line for safe driving on the map when the preset condition for generating the map and displaying the guide line is satisfied.

The preset condition for generating the map and displaying the guide line may include a biometric signal of a driver. The method may further include generating the map and displaying the guide line when the driver's biometric signal exceeds a preset value.

The biometric signal may include the driver's heart rate.

The preset condition for generating the map and displaying the guide line may include an operation direction and an operation amount of a steering wheel of the vehicle. The method may further include generating the map and displaying the guide line when the operation direction of the steering wheel is opposite to the turn signal operation direction of the vehicle and the operation angle of the steering wheel is greater than or equal to a preset angle.

The preset condition for generating the map and displaying the guide line may include a weather condition or illuminance. The method may further include generating the map and displaying the guide line when it is raining or the illuminance is a preset illuminance or less.

The illuminance may include the number of light sources around the vehicle.

The preset condition for generating the map and displaying the guide line may include comparing driving statistics of other drivers at the place where the vehicle is located and the actual driving of the vehicle. The method may further include generating the map and displaying the guide line when the difference between the driving statistics and the actual driving exceeds a preset value.

The control method may further include, when the map of the place where the vehicle is located already exists, displaying the guide line for safe driving on the map of the place where the vehicle is located that already exists.

The control method may further include lowering the frequency of generating the map and displaying the guide line when the gender of the driver of the vehicle is male and maintaining the frequency of generating the map and displaying the guide line as the frequency before the lowering when the gender of the driver of the vehicle is female.

In accordance with another aspect of the disclosure, a vehicle includes a display and a controller. The controller is configured to check whether a preset condition for generating a map and displaying a guide line is satisfied while the vehicle is driving, generate a new map around a place where the vehicle is located and display it through the display when the preset condition for generating the map and displaying the guide line is satisfied, and display the guide line for safe driving on the map.

The preset condition for generating the map and displaying the guide line may include a biometric signal of a driver. The controller may be configured to generate the map and display the guide line when the driver's biometric signal exceeds a preset value.

The biometric signal may include the driver's heart rate.

The preset condition for generating the map and displaying the guide line may include an operation direction and an operation amount of a steering wheel of the vehicle. The controller may be configured to generate the map and display the guide line when the operation direction of the steering wheel is opposite to the turn signal operation direction of the vehicle and the operation angle of the steering wheel is greater than or equal to a preset angle.

The preset condition for generating the map and displaying the guide line may include a weather condition or illuminance. The controller may be configured to generate the map and display the guide line when it is raining or when the illuminance is a preset illuminance or less.

The illuminance may include the number of light sources around the vehicle.

The preset condition for generating the map and displaying the guide line may include comparing driving statistics of other drivers around the place where the vehicle is located and the actual driving of the vehicle. The controller may be configured to generate the map and display the guide line when the difference between the driving statistics and the actual driving exceeds a preset value.

The controller may be configured to, when the map around the place where the vehicle is located already exists, display the guide line for safe driving on the map by calling the map that already exists.

The controller may be configured to lower the frequency of generating the map and displaying the guide line when the gender of the driver of the vehicle is male and maintain the frequency of generating the map and displaying the guide line as the frequency before the lowering when the gender of the driver of the vehicle is female.

In accordance with another aspect of the disclosure, a control method of a vehicle includes, when the map of the surroundings around the place where the vehicle is located already exists, while the vehicle is driving, displaying the guide line for safe driving on the map by calling the map that already exists. The method also includes checking whether a preset condition for generating a map and displaying a guide line is satisfied when the map of the surroundings around the place where the vehicle is located does not already exist. The method also includes generating a new map of the surroundings around the place where the vehicle is located and displaying the guide line for safe driving on the map when the preset condition for generating the map and displaying the guide line is satisfied.

The control method may further include lowering the frequency of generating the map and displaying the guide line when the gender of the driver of the vehicle is male and maintaining the frequency of generating the map and displaying the guide line as the frequency before the lowering when the gender of the driver of the vehicle is female.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 4 is a diagram illustrating a control method of a vehicle according to an embodiment of the present disclosure.

DETAILED DESCRIPTION

Figure 1:
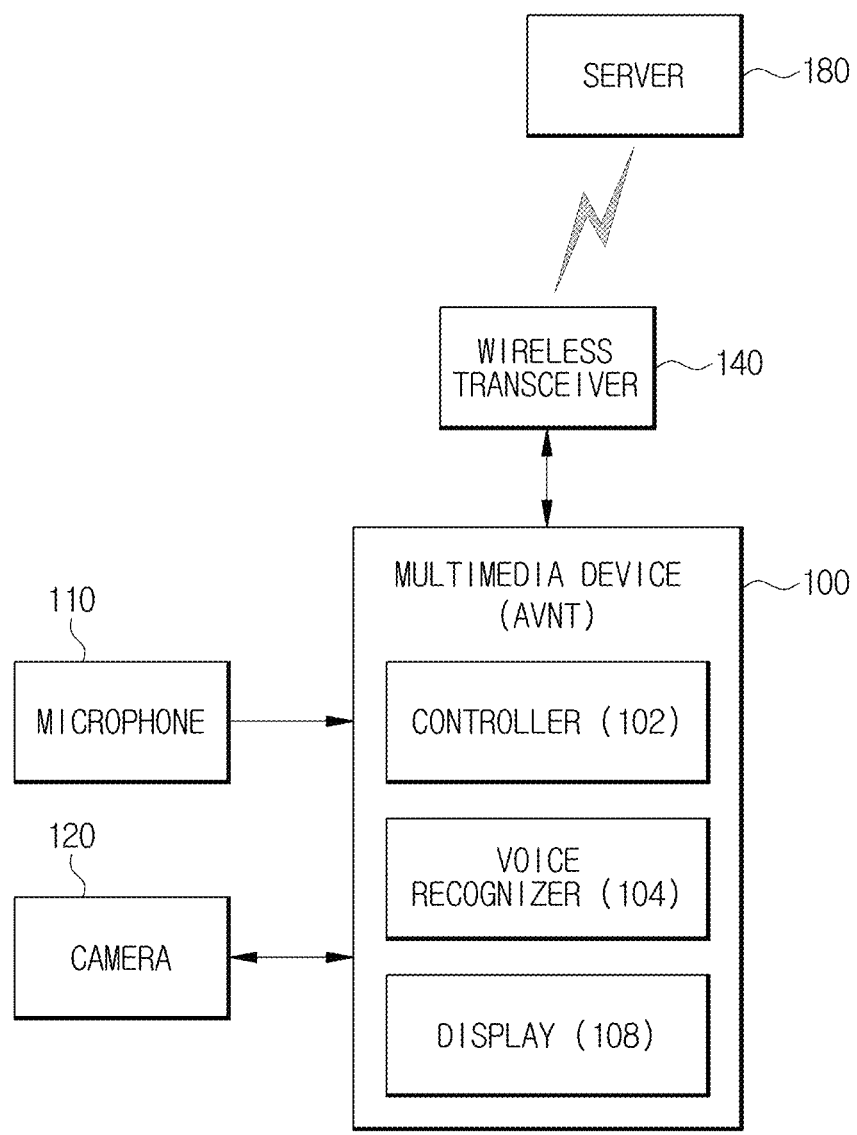
FIG. 1 is a view showing a control system of a vehicle according to an embodiment of the present disclosure.

When a component, device, element, or the like of the present disclosure is described as having a purpose or performing an operation, function, or the like, the component, device, or element should be considered herein as being "configured to" meet that purpose or to perform that operation or function. FIG. 1 is a view illustrating a vehicle according to an embodiment of the present disclosure. The vehicle 100 shown in FIG. 1 externally has the following structure.

FIG. 1 is a view showing a control system of a vehicle according to an embodiment of the present disclosure. In a vehicle according to an embodiment of the present disclosure, a determination and execution of whether or not to generate a map for safe driving and provide a guide line for safe driving to the driver is performed under the control of the multimedia device 100. In this process, it is possible to communicate with the remote server 180 through the wireless transceiver 140.

As shown in FIG. 1, the multimedia device 100 may perform an AVNT (Audio Video Navigation Telematics) function and may include a controller 102, a voice recognizer 104, and a display 108.

The controller 102 is in charge of overall control for determining and executing a map generation for safe driving and provision of a guide line or driving path to the driver through the multimedia device 100. The controller 102 determines whether a plurality of preset conditions are satisfied and determines whether to generate a map for safe driving and provide a guide line based on the determination result.

The voice recognizer 104 receives a voice signal generated by the driver's utterance through the microphone 110 and analyzes the utterance to determine the driver's gender.

The display 108 is provided to display a map and guide lines for safe driving to be provided to the driver.

The microphone 110 and the camera 120 are connected to the multimedia device 100 to enable communication.

The microphone 110 receives a voice signal generated by the driver's utterance and transmits the voice signal to the voice recognizer 104.

The camera 120 is provided to generate an image by photographing the surroundings around the vehicle. The camera 120 may be an around view camera (or surround view camera) capable of generating a 360-degree image around the vehicle through synthesis of images obtained by photographing the surroundings of the vehicle from various angles.

Figure 2:
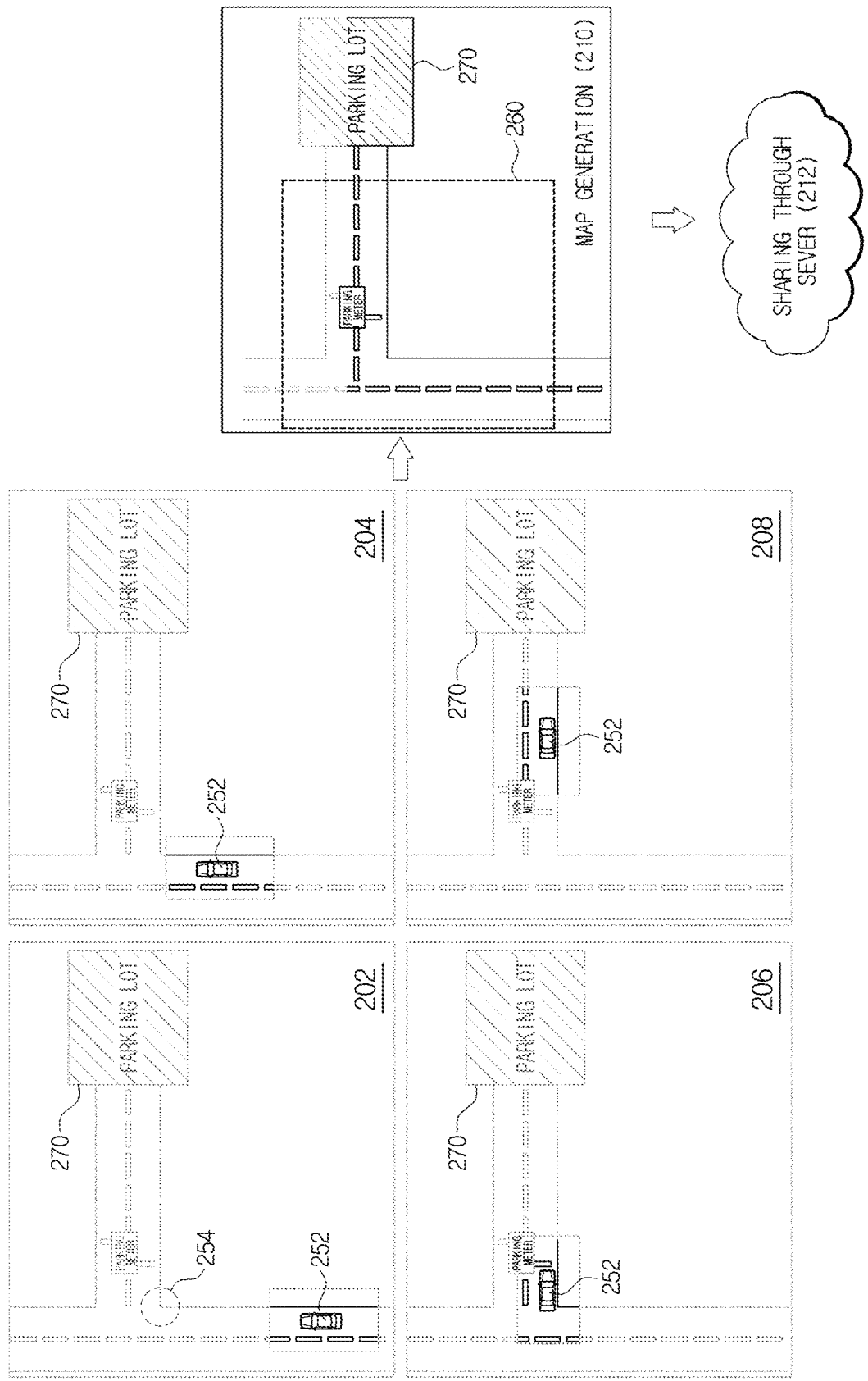
FIG. 2 is a diagram illustrating an example of generating a map according to an embodiment of the present disclosure.

FIG. 2 is a diagram illustrating an example of generating a map according to an embodiment of the present disclosure.

As shown in FIG. 2, while the vehicle 252 moves in the order of 202-204-206-208 to enter the parking lot 270, the surroundings of the vehicle 252 are photographed via the camera 120 and a map 260 is generated as indicated by a dotted line (210). The generated map is transmitted to the server 180, stored, and shared with other drivers (212).

When there is no pre-stored map information that may be shared, the vehicle 252 may generate a map in real time and display a guide line for safe driving. For example, the vehicle 252 allows the driver of the vehicle 252 to safely pass the corner 254 of the place shown in FIG. 2 by generating a map by photographing an image before turning the corner 254 in a place such as that shown in FIG. 2 and by displaying a guide line for safely passing the corner 254 (see 302 and 304 in FIG. 3 to be described below) on a map through the display 108.

Figure 3:
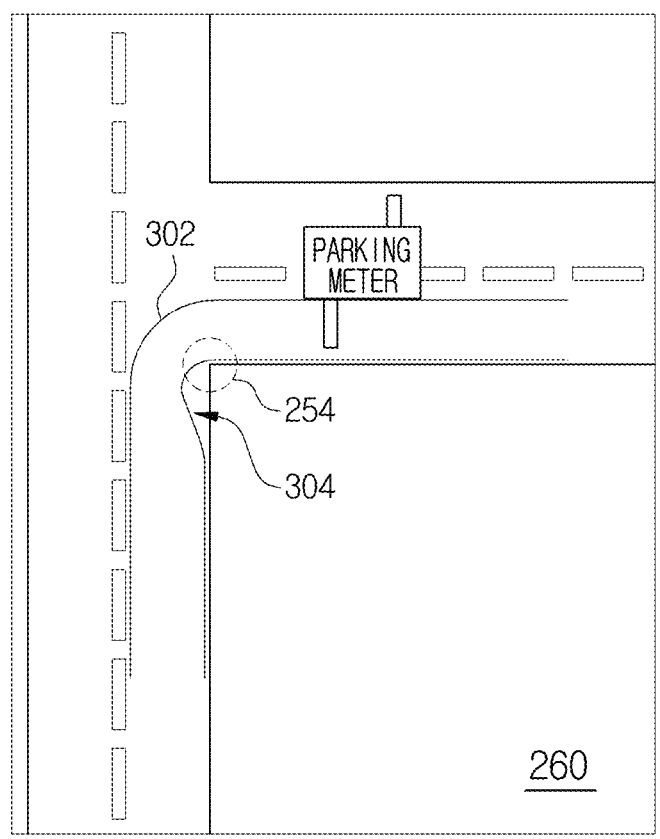
FIG. 3 is a diagram illustrating a map generated through the process of FIG. 2 and a guide line for safe driving.

FIG. 3 is a diagram illustrating a map generated through the process of FIG. 2 and a guide line for safe driving.

In a place such as that shown in FIG. 2 above, the vehicle 252 must turn the corner 254 in order to enter the parking lot 270. An experienced driver will drive around the corner 254 without a problem, but an unskilled driver may cause a contact accident while passing through the corner 254.

Accordingly, a map 260 as shown in FIG. 3 is generated through a process as shown in FIG. 2 to display a guide line 302 for safe driving. In FIG. 3, a portion indicated by reference numeral 304 is an example of a guide line for safe driving and is intended to guide the vehicle to maintain a large turning radius in order to safely pass the corner 254. Accordingly, when other drivers enter the parking lot 270 in the same place in the future, they may safely pass the corner 254 by referring to the guide line 302.

FIG. 4 is a diagram illustrating a control method of a vehicle according to an embodiment of the present disclosure. Through the control method illustrated in FIG. 4, a new map may be generated, or a previously stored map may be imported from the server 180 and a guide line may be displayed for enabling the driver to drive safely.

As shown in FIG. 4, first, the controller 102 checks whether the vehicle has arrived near the destination (402). In this case, the controller 102 checks whether the vehicle has arrived near the destination (within a preset distance), rather than at the final destination.

When it is confirmed or when confirming that the vehicle has arrived near the destination, the controller 102 checks whether a pre-stored map of the corresponding place exists in the server 180 (404). Alternatively, the controller 102 may check whether a pre-stored map of the corresponding place exists in the storage means of the vehicle.

When a pre-stored map of the place exists in the server 180 (YES in 404), the controller 102 imports a map (260 of FIG. 2 or 3) previously stored in the server 180 or a storage means of the vehicle and displays a guide line for safe driving (302 of FIG. 3) on the corresponding map (406). The display of the map and guide line may be displayed through the display 108 of the multimedia device 100. The vehicle driver may perform safe driving by referring to the map and guide lines displayed through the display 108 of the multimedia device 100.

Returning to step 404, if the pre-stored map of the place does not exist in the server 180 (NO in 404), the controller 102 determines whether the driver's gender is male or female (408). The reason for determining the driver's gender is to adjust the frequency of generating the map and displaying the guide line relatively insensitively for males who are relatively familiar with driving compared to females. In other words, in the case of females who are or may be relatively less familiar with driving, the frequency of generating the map and displaying the guide line is relatively increased compared to the case of males to induce safer driving.

When the driver is a male ('male' in 408), the controller 102 adjusts so that the execution frequency of generating the map and displaying the guide line is lowered (410).

When the driver is male and the frequency of generating the map and displaying the guide line is adjusted to decrease, or when the driver is female, the controller 102 checks whether a preset condition for generating the map and displaying the guide line is satisfied (412).

When the preset condition for generating the map and displaying the guide line is satisfied (YES in 412), the controller 102 generates a new map as shown in FIGS. 2 and 3 and displays the guide line on the generated map (414).

When the preset condition for generating the map and displaying the guide line is not satisfied (NO in 412), the controller 102 terminates the control without generating the map and displaying the guide line.

In step 414 described above, embodiments of a preset condition for generating a map and displaying a guide line are as follows.

An example of a preset condition for generating a map and displaying a guideline may utilize a biometric signal of a driver through a sensor of a health care system. For example, using the driver's heart rate measurement result, when the driver's heart rate exceeds the preset value when arriving near the destination, the controller 102 may determine that the driver has difficulty in parking or entering and automatically generate a map and display a guide line. The sensor of the healthcare system may be a heart rate sensor included in a band-type or watch-type device worn on a wrist.

According to another example of a preset condition for generating a map and displaying a guide line, when the steering wheel operation direction of the vehicle is opposite to the turn signal operation direction and the steering wheel operation angle is greater than or equal to a preset angle near the destination, the controller 102 may determine that the driver has difficulty in parking or entering and automatically generate a map and display a guide line.

According to another example of a preset condition for generating a map and displaying a guide line, when it is raining when the vehicle arrives near its destination (measured by the rain sensor) or the surroundings are dark (measured by the illumination sensor), the controller 102 may determine that the driver has difficulty in parking or entering and automatically generate a map and display a guide line. The measurement of illuminance may be replaced by confirming a case where the number of lights is a preset number or less in the surrounding image photographed by the camera.

Another example of a preset condition for generating a map and displaying a guide line may automatically generate a map and display the guide line based on the comparison result of the actual driving of the vehicle 252 and the past driving statistics of various other drivers in the corresponding place (for example, the access road to the parking lot as shown in FIG. 2). For example, in a state in which past driving results (driving paths) of other drivers in the corresponding place are learned through deep learning, the probability for each driving result is calculated and stored in the server 180. When the driving path of the vehicle 252 exceeds a preset standard deviation of the learning result, the controller 102 may determine that the driver has difficulty in parking or entering and automatically generate a map and display a guide line. In other words, when the actual path at the initial stage of entry of the vehicle 252 is within a preset standard deviation of the learning result, it may be determined that the vehicle 252 is driving relatively safely. On the contrary, it may be determined that the actual path at the initial entry of the vehicle 252 exceeds a preset standard deviation of the learning result as unsafe driving. Therefore, in this case, it is desirable to automatically generate a map and display a guide line by determining that the driver has difficulty in parking or entering.

Any one of the above conditions may be selected, or two or more conditions may be combined. In addition, embodiments of the preset condition for generating a map and displaying a guide line are not limited to those described above and various other methods may be applied.

The present disclosure is intended to promote safe driving of the driver by securing a map around the vehicle and displaying the guide line for safe driving when the driver needs to display a guide line for safe driving while the vehicle is driving.

The above description merely illustrates the technical idea and those having ordinary skill in the technical field of the present disclosure should be able to make various modifications, changes, and substitutions within the range not departing from the essential characteristics. Accordingly, the disclosed embodiments and the accompanying drawings are not intended to limit the technical idea, but to describe the technical idea. The scope of the technical idea is not limited by these embodiments and the accompanying drawings. The scope of protection should be interpreted by the scope of the claims below and all technical ideas within the scope of the same should be construed as being included in the scope of the rights.

What is claimed is:

1. A control method of a vehicle, the control method comprising:
   checking whether a preset condition for generating a map and displaying a guide line is satisfied while the vehicle is driving; and
   generating the map of surroundings around a place where the vehicle is located and displaying the guide line for safe driving on the map when the preset condition for generating the map and displaying the guide line is satisfied, wherein the preset condition for generating the map and displaying the guide line comprises an operation direction and an operation amount of a steering wheel of the vehicle, and wherein the method further comprises generating the map and displaying the guide line when the operation direction of the steering wheel is opposite to a turn signal operation direction of the vehicle and an operation angle of the steering wheel is greater than or equal to a preset angle.

2. The control method according to claim 1, wherein the preset condition for generating the map and displaying the guide line comprises a biometric signal of a driver, and wherein the method further comprises generating the map and displaying the guide line when the biometric signal of the driver exceeds a preset value.

3. The control method according to claim 2, wherein the biometric signal comprises a heart rate of the driver.

4. The control method according to claim 1, wherein the preset condition for generating the map and displaying the guide line comprises a weather condition or illuminance, and wherein the method further comprises generating the map and displaying the guide line when it is raining or when the illuminance is less than or equal to a preset illuminance.

5. The control method according to claim 4, wherein the illuminance comprises a number of light sources around the vehicle.

6. The control method according to claim 1, wherein the preset condition for generating the map and displaying the guide line comprises comparing driving statistics of other drivers at the place where the vehicle is located and actual driving of the vehicle, and wherein the method further comprises generating the map and displaying the guide line when a difference between the driving statistics of the other drivers and the actual driving of the vehicle exceeds a preset value.

7. The control method according to claim 1, further comprising:

when the map of the place where the vehicle is located is present, displaying the guide line for safe driving on the map of the place where the vehicle is located.

8. The control method according to claim 1, further comprising:

lowering a frequency of generating the map and displaying the guide line when a gender of a driver of the vehicle is male; and maintaining the frequency of generating the map and displaying the guide line as the frequency before the lowering when the gender of the driver of the vehicle is female.

9. A vehicle comprising:

a display; and a controller configured to check whether a preset condition for generating a map and displaying a guide line is satisfied while the vehicle is driving, generate the map of surroundings around a place where the vehicle is located and display it through the display when the preset condition for generating the map and displaying the guide line is satisfied, and display the guide line for safe driving on the map, wherein the preset condition for generating the map and displaying the guide line comprises an operation direction and an operation amount of a steering wheel of the vehicle, and wherein the controller is configured to generate the map and display the guide line when the operation direction of the steering wheel is opposite to a turn signal operation direction of the vehicle and an operation angle of the steering wheel is greater than or equal to a preset angle.

10. The vehicle according to claim 9, wherein the preset condition for generating the map and displaying the guide line comprises a biometric signal of a driver, and wherein the controller is configured to generate the map and display the guide line when the biometric signal of the driver exceeds a preset value.

11. The vehicle according to claim 10, wherein the biometric signal comprises a heart rate of the driver.

12. The vehicle according to claim 9, wherein the preset condition for generating the map and displaying the guide line comprises a weather condition or illuminance, and wherein the controller is configured to generate the map and display the guide line when it is raining or when the illuminance is less than or equal to a preset illuminance.

13. The vehicle according to claim 12, wherein the illuminance comprises a number of light sources around the vehicle.

14. The vehicle according to claim 9, wherein the preset condition for generating the map and displaying the guide line comprises comparing driving statistics of other drivers around the place where the vehicle is located and actual driving of the vehicle, and wherein the controller is configured to generate the map and display the guide line when a difference between the driving statistics of the other drivers and the actual driving of the vehicle exceeds a preset value.

15. The vehicle according to claim 9, wherein the controller is configured to, when the map of the surroundings around the place where the vehicle is located is present, display the guide line for safe driving on the map by calling the map.

16. The vehicle according to claim 9, wherein the controller is configured to lower a frequency of generating the map and displaying the guide line when a gender of a driver of the vehicle is male and to maintain the frequency of generating the map and displaying the guide line as the frequency before the lowering when the gender of the driver of the vehicle is female.

17. A control method of a vehicle, the control method comprising:

when an existing map of surroundings around a place where the vehicle is located is present while the vehicle is driving, displaying a guide line for safe driving on the existing map by calling the existing map;

checking whether a preset condition for generating a new map and displaying a guide line is satisfied when the existing map of the surroundings around the place where the vehicle is located is not present; and generating the new map of the surroundings around the place where the vehicle is located and displaying the guide line for safe driving on the new map when the preset condition for generating the new map and displaying the guide line is satisfied, wherein the preset condition for generating the new map and displaying the guide line comprises an operation direction and an operation amount of a steering wheel of the vehicle, and wherein the method further comprises generating the new map and displaying the guide line when the operation direction of the steering wheel is opposite to a turn signal operation direction of the vehicle and an operation angle of the steering wheel is greater than or equal to a preset angle.

18. The control method according to claim 17, further comprising:
lowering a frequency of generating the new map and displaying the guide line when a gender of a driver of the vehicle is male; and
maintaining the frequency of generating the new map and displaying the guide line as the frequency before the lowering when the gender of the driver of the vehicle is female.

* * * * *